United States Patent
Nurmi et al.

(10) Patent No.: US 7,516,395 B2
(45) Date of Patent: Apr. 7, 2009

(54) MEMORY CHECKING APPARATUS AND METHOD

(75) Inventors: Juha H-P Nurmi, Salo (FI); Kaj Saarinen, Turku (FI)

(73) Assignee: Nokia Corporation, Espoo (FI)

( * ) Notice: Subject to any disclaimer, the term of this patent is extended or adjusted under 35 U.S.C. 154(b) by 548 days.

(21) Appl. No.: 11/249,063

(22) Filed: Oct. 12, 2005

(65) Prior Publication Data

US 2007/0083790 A1 Apr. 12, 2007

(51) Int. Cl.
 G06F 7/02 (2006.01)
(52) U.S. Cl. ..................................... 714/819
(58) Field of Classification Search .................. 714/12, 714/819; 365/222
 See application file for complete search history.

(56) References Cited

U.S. PATENT DOCUMENTS 6,091,658 A * 7/2000 McDonald et al. .......... 365/228
6,101,620 A * 8/2000 Ranganathan ............... 714/718
6,438,056 B2 * 8/2002 Aue ........................... 365/222
6,838,331 B2 * 1/2005 Klein .......................... 438/238
2003/0048665 A1 * 3/2003 Thomsen et al. ........ 365/185.25

* cited by examiner

*Primary Examiner*—Esaw T Abraham
*Assistant Examiner*—Sam Rizk
(74) *Attorney, Agent, or Firm*—Harrington & Smith, PC

(57) ABSTRACT

Image or other data is stored in a memory. A first validation parameter (e.g., a checksum) is determined for the data stored in the memory at a first time, and stored. A second validation parameter is determined for the data stored in the memory at a second time, and also stored. The stored first and second validation parameters are then compared. In this manner, corruption of data in the memory may be determined by the comparison. In the case where the compared first and second validation parameters are not identical (within a threshold in certain embodiments), the data stored in the memory is updated. As applied to graphical image data, this is seen as advantageous over the prior art approach of periodically updating a frame memory even when no new image data set is present. Apparatus and computer program products are also detailed.

19 Claims, 5 Drawing Sheets

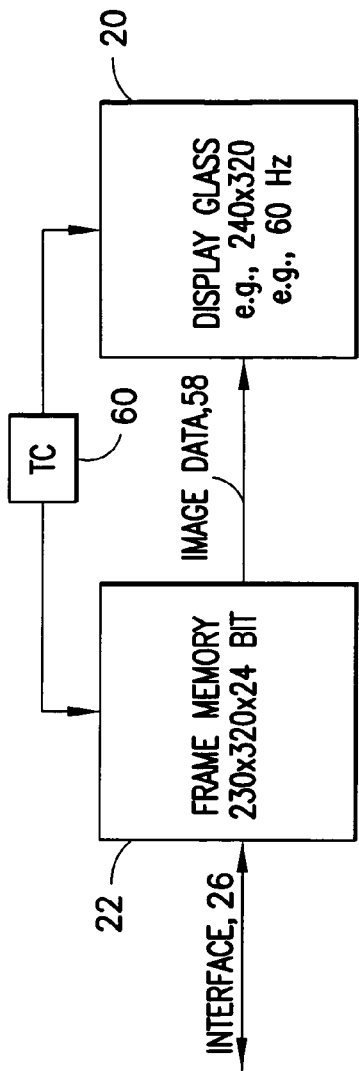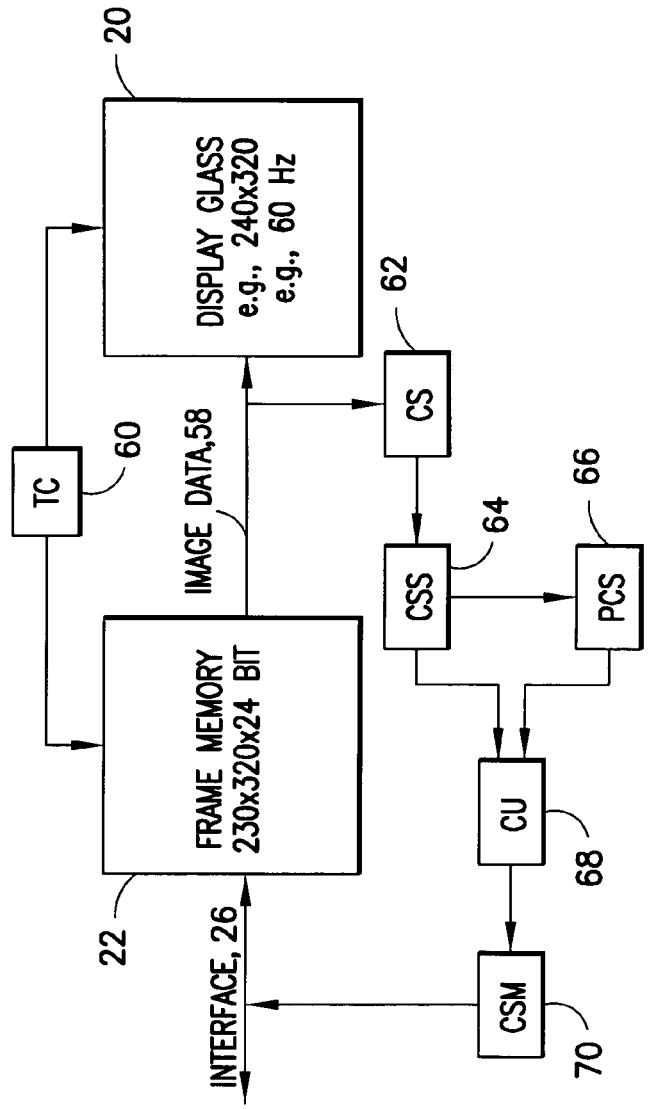
FIG.3A
FIG.3B

MEMORY CHECKING APPARATUS AND METHOD

TECHNICAL FIELD

The present invention relates to memory, such as for example a frame memory for a graphical display interface, and particularly relates to memory content checking and refreshing the contents of the memory.

BACKGROUND

In a portable electronic device such as a mobile station, or any computing device that uses a graphical display screen such as a personal computer, the data that is displayed is fed from what is generally termed a frame memory. The data of the frame memory may be corrupted, e.g., by an electrostatic discharge (ESD) pulse from a user's touch. The risk of ESD pulse is particularly high when a person handles an expansion card or opens a computing device and touches an internal component or mounting hardware. Nevertheless, the prior art appears not to distinguish between normal use and these high risk situations in addressing the problem of data corruption at the frame memory. While and ESD pulse is of primary concern, the problem arises with any noise pulse. The risk of data corruption is more prevalent in smaller devices that operate on smaller current, as the same ESD pulse corrupts microcurrent data more readily than data moving with a larger current.

To minimize the amount of time that corrupted data in the frame memory might be displayed at the display screen, the contents of the frame memory is updated periodically with correct data, such as every few seconds. The display of any corrupted data is therefore short-lived. This is not seen to be the most elegant solution. A typical quarter VGA (QVGA) display screen of a mobile station has resolution of 240*320*24 bits, which occupies 1,843,200 bits or about 230,400 bytes of frame memory. Compared to 30-50 bytes for other registers, updating the frame memory even periodically is a power and data-intense endeavor.

The substance of the problem is illustrated in FIGS. 1A-1B, which present slightly different schematic block diagrams of the same relevant portions of a mobile station. In FIGS. 1A-1B, the display screen 20 is updated continuously from the frame memory 22, which resides typically in the display driver 24. The display screen 20 and the driver 24 with its frame memory 22 are typically manufactured as a single sub-component, commonly termed a display unit. To ensure that corrupted data is not displayed for a prolonged period of time, the controlling software, typically located primarily in the main memory but with some lower level functions disposed in the display driver 24, refreshes the contents of the frame memory 22 via the interface 26 periodically, commonly every few seconds. The flex foil 28 of FIG. 1A illustrates uploads to the frame memory to reduce data bottlenecks, and the interface 26 leads to a main memory via a processor (neither shown in FIGS. 1A-1B). While the frame memory 22 may update the display screen 20 continuously (e.g., 60 times per second or 60 Hz), those components are matched to one another and share a dedicated link 30, an advantage in manufacturing them as a single sub-component. Updating the frame memory 22 over the interface 26 involves more components within the overall device (such as the processor or main memory within the overall device), and occupies data transfer busses that are used by other components for other processes.

What is needed in the art is a more elegant method and apparatus to ensure that the display screen presents accurate data, or that any corrupted data that it does display is minimized in time or extent. The solution described herein has broad applications for validating data stored in any memory, whether or not related to a display memory.

SUMMARY

The foregoing and other problems are overcome, and other advantages are realized, in accordance with the presently described embodiments of these teachings.

In accordance with one aspect, the present invention is a method for validating data, such as for example image data, that is stored in a memory such as for example a frame memory. According to this method, data is stored in a memory and a first validation parameter is determined for the data stored in the memory at a first time, and the first validation parameter is stored. A second validation parameter is determined for the data stored in the memory at a second time, and that second validation parameter is also stored. The stored first and second validation parameters are then compared. In this manner, corruption of data in the memory may be determined by the comparison. In the case where the compared first and second validation parameters is not equal within a threshold, the image data is updated to the memory. For example, an update image data may be refreshed to the frame memory if first and second checksum validation parameters are within at least five of one another. This is seen as advantageous over the prior art approach of periodically updating a frame memory even when no new image data set to be displayed is present. To enable the simplest comparison in this embodiment, the first and second validation parameters (preferably checksums) are identically calculated.

In accordance with another aspect, the present invention is a graphical display unit that includes a graphical display screen, a memory, a calculator, first and second registers, and a comparator. The memory is for storing image data, and has an output coupled to an input of the display screen for refreshing the image data to the display screen. The calculator has an input coupled to an output of the memory for determining a validation parameter of the image data. Preferably, the same output of the memory serves as input to the display screen and the calculator. The first register has an input coupled to an output of the calculator, and the second register has an input coupled to a first output of the first register. The comparator has parallel inputs from a second output of he first register and an output of the second register. There may be a third register having an output coupled to an input of the comparator for storing a comparison result. In one embodiment, the graphical display unit is a component of a mobile station.

In accordance with another aspect, the present invention is an apparatus that includes storage means for storing image data, and display means that is coupled to the storage means for displaying the image data. This apparatus further has timing means for controlling a rate [R Hz] at which the image data is refreshed to the display means, and calculating means for determining a validation parameter of the image data at different times according to the rate R Hz. This apparatus also includes comparing means for comparing the validation parameters determined at the different times. In an embodiment, the storage means is a frame memory, the display means is a graphical display screen, the timing means is a local clock, the calculating means is a calculator for determining a checksum, and the comparing means includes two registers for storing the checksums determined at different times and a comparator unit for comparing the checksums stored in the registers. In that latter embodiment, all recited elements are in a display unit that serves as a component of an electronic device such as a mobile station.

In accordance with another aspect, the present invention is a program of machine-readable instructions, tangibly embodied on an information bearing medium and executable by a digital data processor, to perform actions directed toward validating a memory. The actions include determining at a first time a first validation parameter of data stored in a memory, and storing that first validation parameter. At a second time a second validation parameter of the image data is determined, and that second validation parameter is also stored. The first and second validation parameters are compared, and the result is stored. Preferably, the first and second validation parameters relate to data stored in the same memory, where the first and second times ideally correspond to a first (e.g., original) set of data and a refreshed set of data. In this manner, the computer program validates the refreshed data.

Further details as to various embodiments and implementations are detailed below.

BRIEF DESCRIPTION OF THE DRAWINGS

The foregoing and other aspects of these teachings are made more evident in the following Detailed Description, when read in conjunction with the attached Drawing Figures, wherein:

FIGS. 3A-3B are block diagrams of various components of the mobile station of FIG. 2 illustrating an embodiment of the invention.

DETAILED DESCRIPTION OF EMBODIMENTS OF THE INVENTION

Figure 2:
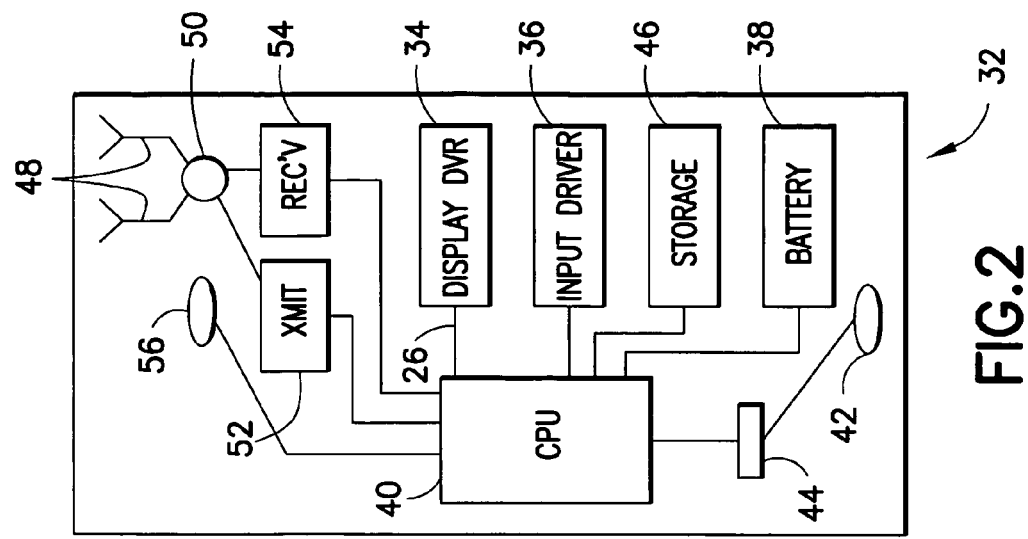
FIG. 2 is a schematic diagram of a mobile station in which the present invention may be embodied.
Figure 1A:
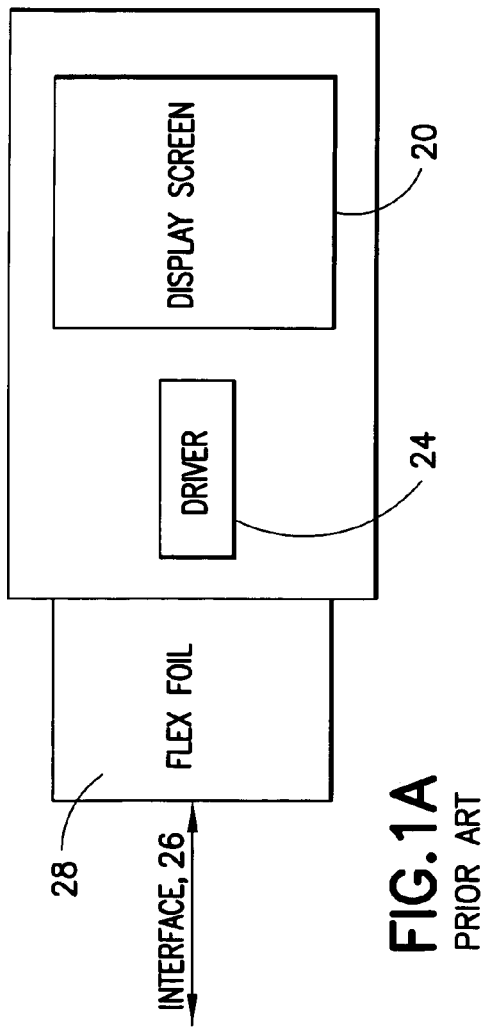
FIGS. 1A-1B are slightly differing schematic block diagrams of the same relevant portions of a prior art mobile station.
Figure 1B:
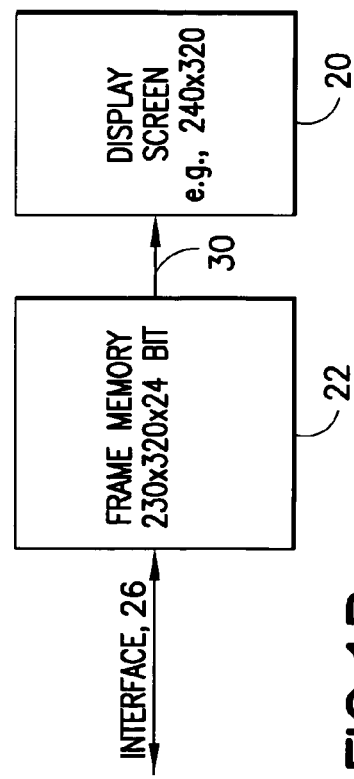

FIG. 2 illustrates a schematic diagram of a mobile station MS 32 in which the present invention may be embodied. The present invention may be disposed in any host computing device having a graphical display element, whether or not the device is mobile, whether or not it is coupled to a cellular of other data network or even capable of communicating with other devices via a network. A MS 32 is a handheld portable device that is capable of wirelessly accessing a communication network, such as a mobile telephony network of base stations that are coupled to a publicly switched telephone network. A cellular telephone, a Blackberry® device, and a personal digital assistant (PDA) with internet or other two-way communication capability are examples of a MS 32. A portable wireless device includes mobile stations as well as additional handheld devices such as walkie talkies and devices that may access only local networks such as a wireless localized area network (WLAN) or a WIFI network.

The component blocks illustrated in FIG. 2 are functional and the functions described below may or may not be performed by a single physical entity as described with reference to FIG. 2. A display driver 34, such as a circuit board for driving a graphical display screen 20, and an input driver 36, such as a circuit board for converting inputs from an array of user actuated buttons and/or a joystick to electrical signals, are provided with the display screen 20 and button/joystick array (not shown) for interfacing with a user. The input driver 36 may also user convert inputs at the display screen 20 when such display screen 20 is touch sensitive, as known in the art. The MS 32 further includes a power source 38 such as a self-contained battery that provides electrical power to a central processor 40 that controls functions within the MS 32. Within the processor 40 are functions such as digital sampling, decimation, interpolation, encoding and decoding, modulating and demodulating, encrypting and decrypting, spreading and despreading (for a CDMA compatible MS 32), and additional signal processing functions known in the art.

Voice or other aural inputs are received at a microphone 42 that may be coupled to the processor 40 through a buffer memory 44. Computer programs such as algorithms to modulate, encode and decode, data arrays such as look-up tables, and the like are stored in a main memory storage media 46 which may be an electronic, optical, or magnetic memory storage media as is known in the art for storing computer readable instructions and programs and data. The main memory 46 is typically partitioned into volatile and non-volatile portions, and is commonly dispersed among different storage units, some of which may be removable. The MS 32 communicates over a network link such as a mobile telephony link via one or more antennas 48 that may be selectively coupled via a T/R switch 50, or a diplex filter, to a transmitter 52 and a receiver 54. The MS 32 may additionally have secondary transmitters and receivers for communicating over additional networks, such as a WLAN, WIFI, Bluetooth®, or to receive digital video broadcasts. Known antenna types include monopole, di-pole, planar inverted folded antenna PIFA, and others. The various antennas may be mounted primarily externally (e.g., whip) or completely internally of the MS 32 housing as illustrated. Audible output from the MS 32 is transduced at a speaker 56. Most of the above-described components, and especially the processor 40, are disposed on a main wiring board (not shown). Typically, the main wiring board includes a ground plane to which the antenna(s) 48 are electrically coupled. Particular aspects of the invention are described below with respect to the display driver 34 and the display screen 20. The interface 26 represents a data path between the display driver 34 and the processor 40, though the interface 26 may in some embodiments be to the main memory 46, and may only be controlled by the processor 40 via a switch without the data link actually passing through the processor 40 as is typical. Implementations of the present invention along different locations of the overall display data pathway are shown separately as between FIGS. 3B and FIGS. 3C-D.

In accordance with embodiments of the invention, a validation parameter of the frame memory 22 is calculated and stored. The expanse of the validation parameter can be as little as one bit, as where all of the data bit values (ones and zeros) of the frame memory 22 are combined (such as via sequential exclusive OR operations or similar) to arrive at essentially a parity bit as the frame memory validation parameter, it may be such a bit for each row and/or column of the frame memory 22 as displayed on the display screen 20, or some other combination. Preferably, the validation parameter is a checksum CS, the addition of all bits of the image data in the frame memory 22. While none of the above exemplary possibilities will identify every instance of data corruption (e.g., two corrupted data bits in offsetting positions may cancel one another and not indicate the presence of corrupted data), the use of a checksum as a validating parameter is seen to be efficient in processing, and will reasonably identify all data corruption over a short period of time even if one or two validations improperly reveal uncorrupted data.

In certain embodiments of the invention, the image displayed at the display screen 20 is refreshed from the frame memory 22 on a continuous basis, for example, 60 Hz. During this updating period, a current checksum CCS is calculated. This calculation is done periodically, preferably each time that the display screen is refreshed from the frame memory 22, such as 60 times each second for a 60 Hz refresh rate. Consider these different time as frames, indexed by the parameter n. In a first or $n^{th}$ frame, an $n^{th}$ CS is calculated and stored. In a second or $n^{th}+1$ frame, an $n^{th}+1$ CS is calculated and stored. The two CS's are compared, where the most recent $n^{th}+1$ CS is the CCS and the dated $n^{th}$ CS is the previous checksum PCS. If they are identical, there is no need to reload the frame memory 22 over the interface 26. So long as the $n^{th}$ CS and the $n^{th}+1$ CS do not straddle a refresh of the frame memory 22 over the interface (e.g., a new set of data to display at the screen), any difference between the CS's indicates corrupted data, and the contents of the frame memory is then reloaded via the interface 26.

In this manner, the data stored in the frame memory is validated. First, a set of data for display at the display screen 20 is loaded into the frame memory 22. A validation parameter of that stored data is determined and saved in a first register, the validation parameter being preferably a checksum of the stored data bits. At a second time, a validation parameter of the stored data at the frame memory 22 is again determined and saved in a second register. The terms first and second register merely indicate different storage cells, as both registers may be within the same physical storage unit, and preferably are for fast access and comparison. The difference between the first and second times preferably corresponds to the refresh rate from the frame memory 22 to the screen 20. For example, if the refresh rate is 60 Hz, the difference between the first and second times may be 1/60 of a second (calculating a validation parameter of the stored memory after each refresh), or any integer m/60 such as every fifth refresh, every $20^{th}$ refresh, every two seconds (m=120), etc. The validation parameters in the first and second registers are then compared. In the event that the comparison is not favorable, the entire data set stored in the frame memory 22 is updated via the interface 26. In certain embodiments, the validation parameters of the two registers need not be exactly alike in order to avoid updating the frame memory contents, and the threshold may depend on the type of validation parameter that is calculated. For a checksum validation parameter, it is preferred that the content of the frame memory is updated if there is any discrepancy. However, embodiments may elect to update the contents of the frame memory 22 only when the disparity exceeds a threshold, such as a difference of more than five, or more than twenty cells difference (as with row and column validation parameters stored in each register). The specific threshold for a non-identical comparison is seen as a design choice.

This represents an advantage over the prior art in that the frame memory is reloaded only when new data is to be displayed (as with the prior art) and when there is an indication of data corruption of present data being displayed, as opposed to every few seconds to mitigate the time corrupted data is presented to the user.

Additionally, the present invention can be used to test the data storage capability of the frame memory. If there is suspected a memory cell or cells in the frame memory 22 that has become inoperable, the contents of the frame memory may be loaded with data having a known CCS value, and the calculated CCS value (the validation parameter) can be read out via the interface to compare against the known value. If the validation parameter of the frame memory is row and column specific, the exact malfunctioning cells may even be pinpointed in most instances. The readout capability used for testing the frame memory 22 as above may be enabled by software, preferably resident in the driver 24 but alternatively within the main storage 46.

Figure 3C:
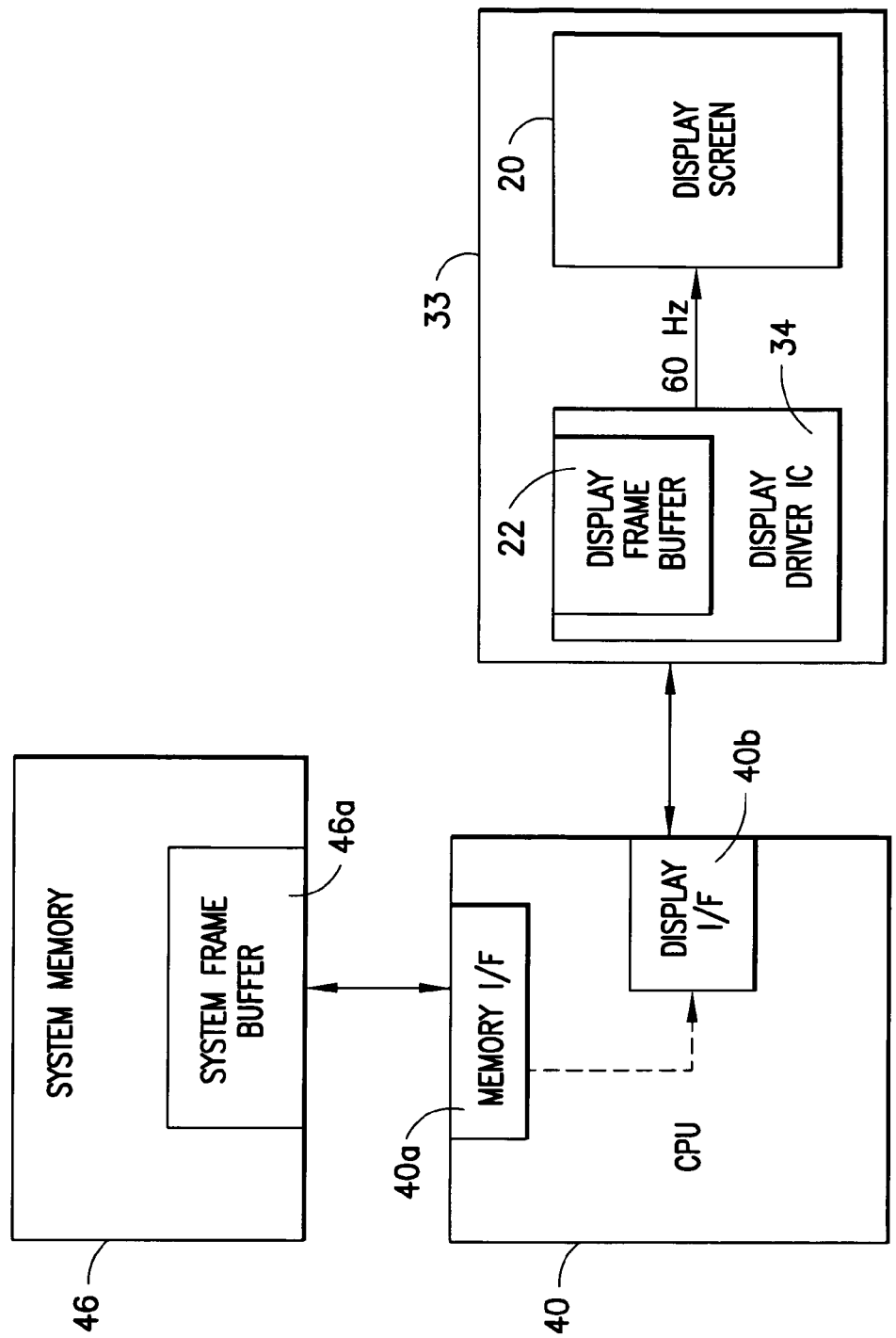
FIGS. 3C-3D are similar to FIG. 3B, showing further segments of the data path over which display data moves, and illustrating different nodes at which the present invention may be employed for different device architectures.

FIGS. 3A-3B illustrate in block diagram the various components used in certain embodiments of the invention. The frame memory 22 and display screen 20 are as previously described, with the exception that the frame memory 22 in embodiments of the invention may store a flag or vertical synchronization pulse as detailed below with respect to FIG. 4, in addition to the data that is displayed at the screen 20. A timing controller TC 60 controls a refresh rate of the frame memory 22 to the screen 20. Typically, the timing controller 60 is local to the display unit and display data transfer over the interface 26 is synchronized to the timing controller 60. This would be advantageous for the embodiment of FIG. 3C in that the display module 33 is made separately from the rest of the system and its clock is not synchronized to the system clock, but data transfer over the interface is synchronized. Alternatively, the timing controller 60 may be a clock signal directly from the master clock of the overall device (e.g., the MS 32), such as a pixel clock signal from the CPU 40 of FIG. 3D used as a base clock for the display module 33. Image data 58 is that data, stored in the frame memory 22, which is refreshed to the screen 20 according to the refresh rate.

FIG. 3B is described with reference to the timing control 60, where a checksum is calculated on each of the 60 Hz clock ticks (for example) at which the image data 58 is refreshed to the screen 20. At a first clock tick (the $n^{th}$ tick), a calculator 62 determines the checksum (or other validation parameter) of the image data 58, and stores it in a first register CCS 64. At a next clock tick ($n^{th}+1$ tick), the frame memory 22 again refreshes the display screen 20 with the image data 58. [It is noted that in this example, the image data 58 refreshed at the first and second clock ticks represent data in the frame memory 22 that has NOT been updated via the interface 26; that situation is detailed with reference to FIG. 4.] At the $n^{th}+1$ clock tick, the validation parameter stored in the first register CCS 64 (from the $n^{th}$ tick) is moved to the second register PCS 66. Simultaneously, the calculator 62 determines the validation parameter of the image data 58 being refreshed to the screen 20 at the $n^{th}+1$ clock tick and stores that validation parameter in the first register CCS 64. At a next clock tick n+2, a comparator unit 68 compares the two validation parameters stored in the first 64 and second 66 registers and stores the result in a third register (checksum memory) CSM 70. The comparator unit 68 may further compare the result of the direct comparison of the first and second registers to a threshold, in embodiments where the frame memory 22 is only updated from the interface 26 when an difference exceeds a threshold, as above. At the following n+3 clock tick, the result stored in the third register 70 is communicated over the interface 26 back toward the processor 40 as an indicator (OK or ERROR) of whether or not the frame memory 22 has corrupted data stored. If the processor 40 reads the signal from the third register as indicating that corrupted data is present, then the contents of the frame memory 22 is updated via the interface on the next $n^{th}+4$ clock tick.

As compared to the prior art, it is clear that the present invention enables updating of frame memory 22 only where there is an indication of corrupted image data 58, rather than periodically on the assumption that there may be corrupted image data 58. This represents a more efficient management of power and processing capacity. Further, the updates to the frame memory may occur much more quickly with the present method (four clock ticks or 1/15 of a second in the above example) as compared to the prior art that periodically updates frame memory 22 every few seconds.

Figure 3D:
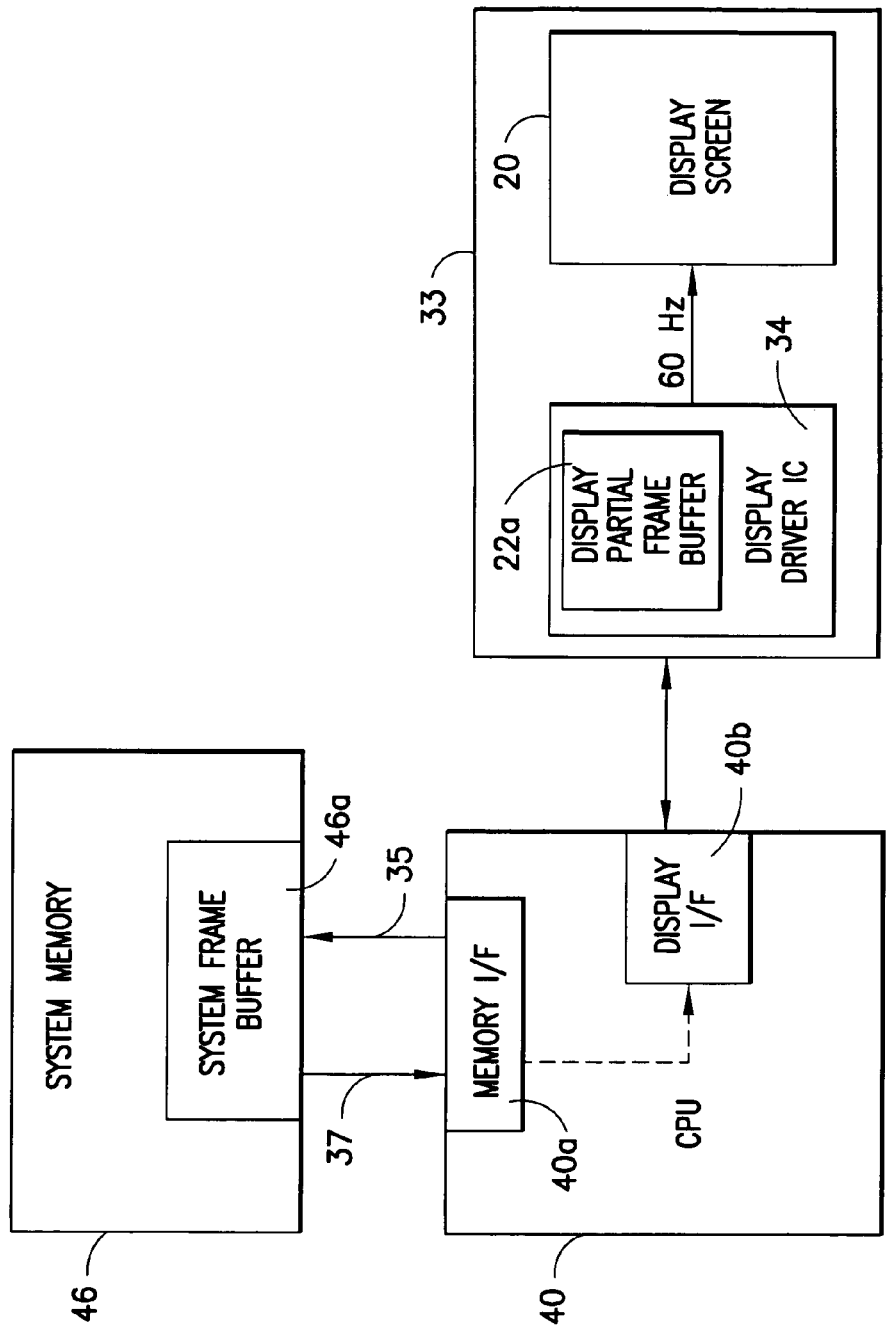

FIGS. 3A and 3B illustrate that the checksums are calculated at the interface between the frame memory 22 and the display screen 20. However, the invention is not limited only to that physical location of determining checksums and validating display data. FIGS. 3C and 3D illustrate exemplary other locations along the data path followed by the display data at which various elements of the present invention may be disposed, either in addition to or instead of the interface between the frame memory 22 and the display screen 20.

FIG. 3C illustrates one device architecture not unlike that shown in FIG. 3A, but expanded further into the device to the system memory 46, shown as main storage media 46 in FIG. 2. In this architecture, the display module 33 (which includes the display driver 34 and the display screen 20) has a full frame memory 22 that stores all data displayed at the screen 20. The system memory 46 has a system frame buffer 46a that stores the display data as well as other system data not for display. The system frame buffer 46a is ported through a memory interface 40a of the CPU 40 to a display interface 40b of that same CPU 40. Anytime display data is changed at the system frame buffer 46a, a checksum CS may be calculated and stored in a register for comparison against another checksum at a later time, which may or may not also be taken from the system frame buffer 46a. For example, at an $n^{th}$ frame, new display data is loaded to the system frame buffer 46a, a checksum CS is calculated, and stored in a register. At a later $n^{th}+x$ frame (sufficiently delayed to allow the new display data from the system memory buffer 46a to route to the display screen 20), a checksum is taken at the interface between the display frame buffer 22 and the screen 20. The CS from the system frame buffer 46a is then compared to the CS from the display frame buffer 22. A discrepancy indicates that the proper data was never loaded into the display frame buffer 22, which may arise when there is data corruption at any of the interfaces 40a, 40b. This may be done in addition to the embodiments of FIG. 3B, where for example the comparison of FIG. 3B is performed at a frequency n/R and the comparison of the display data CS from the system frame buffer 46a to the CS from the display frame buffer 22 is done every 60n/R, where R is the screen 20 refresh rate from the display frame buffer 22 and the former comparison replaces each $60^{th}$ of the latter comparison so only one additional register is required for the system frame memory checksum as the same comparator unit 68 may be used.

The above embodiment may also be done with a checksum calculation at either the memory interface 20a or the display interface 20b. As is clear, such checksum calculation may be either a separate checksum that is compared in addition to those described with reference to FIG. 3B, or in place of where the checksums for both compared frames are drawn from the same data path location upstream (e.g., nearer the system memory 46) of the display frame buffer 22. It is noted that implementation at the system frame memory 46a would require separating display data from other system data for a valid comparison respecting the data to be displayed at the screen 20.

FIG. 3D illustrates an architecture without a full frame memory 22, wherein only some of the data displayed at the screen 20 is stored at the display frame memory, termed in FIG. 3D as a display partial frame buffer 22a. Generally, the architecture of FIG. 3D is more robust against errors that may occur between the system frame buffer 46a and the display screen 20 because possible random errors (in the forward data path 37 and the display interface 40b) are overwritten in each refresh period (e.g., each frame). However, the present invention may still be used as previously described, and may find more particular advantage in being used as an analytical tool for de-bugging when systemic errors are found in getting the proper display data to the screen 20. In the embodiment of FIG. 3D, it is less advantageous to tap a checksum from the reverse data path 35 from the memory interface 40a of the CPU 40 to the system frame buffer 46a, because the display partial frame memory 22a is soon to be updated with new data. The better option is to tap the forward data path 37 from the system frame buffer 46a to the memory interface 40a of the CPU 40, and compare to itself at another frame time since each instance would represent the full data to be displayed at the display screen 20 (notwithstanding errors). Checksums may be calculated and compared at the display partial frame buffer 22a also, as described for the full frame buffer 22 with respect to FIG. 3B.

Figure 4:
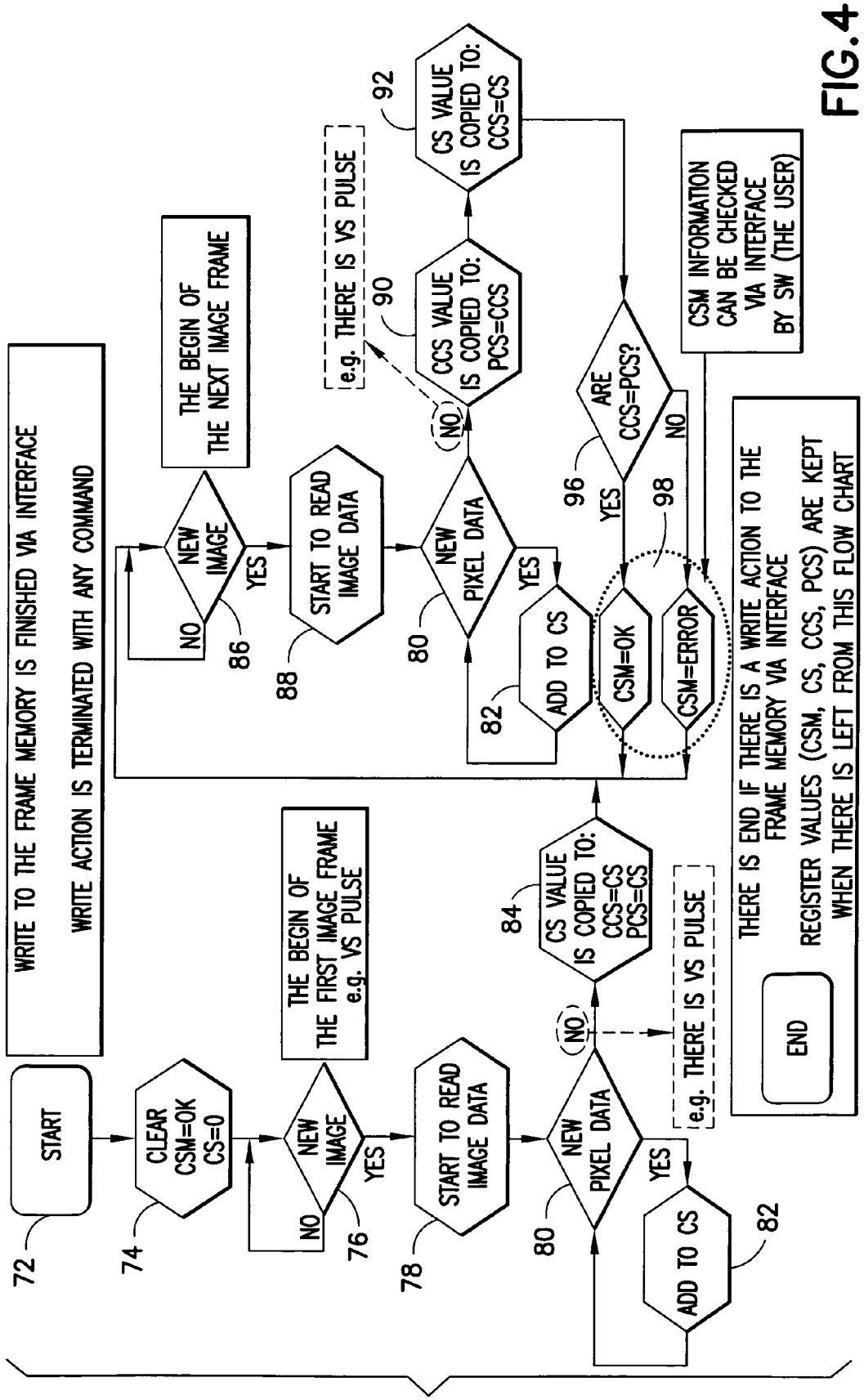
FIG. 4 is a process flow diagram illustrating steps in executing an embodiment of the present invention.

FIG. 4 is a process flow diagram showing more detail, including how certain embodiments of the present invention deal with routine updating of the contents of the frame memory 22 that precede the normal changing of data displayed at the screen 20 not in response to a corruption signal form the third register 70 (e.g., changing a displayed Internet web page, changing from a "connecting to . . . " message displayed at the screen 20 to a "connected" message, etc.). In FIG. 4, the terms image and image data 58 refer to data from the frame memory 22 that is transferred to the display screen 20, and the term pixel data refers to reloading the contents of the frame memory 22 via the interface 26.

When the process is initiated at a start block 72, data is already in the frame memory 22 via some separate start-up sequence (e.g., a display message indicating "powering on") that initiates prior to the process of FIG. 4. The third register 70 is initialized with a "no error" or OK message and the calculator CS 62 is cleared at block 74. According to certain embodiments of the invention, each upload of pixel data over the interface 26 to the frame memory 22 carries a flag or vertical synchronization VS pulse, which is not displayed but rather is used to discern between normal updates of pixel data to the frame memory 22 that purposefully change what is displayed on the screen 20. At a first or $n^{th}$ clock tick after initialization, image data 58 is first loaded or refreshed to the screen 20 at block 76 and the validation parameter of the image data is calculated at block 78 by the calculator CS 62. If the contents of the frame memory are in the process of being updated, e.g., there is not yet a VS pulse because the screen refresh rate is faster than the contents of the frame memory can be completely replaced as is common, the process awaits at blocks 80 and 82 until there is a VS pulse, which being at the end of the sequence of uploaded pixels, indicates there is no further pixel data to load into the frame memory 22. To keep the clock ticks clear, assume that there is no waiting for additional pixel data at blocks 80-82. The calculator 62 then determines at block 84 the validation parameter of the image data 58 that is refreshed to the screen at the $n^{th}$ clock tick.

Also within block 84 but at an n+1 clock tick, the validation parameter is stored at both the first register CCS 64 and the second register PCS 66. This differs from the description of FIG. 3B in that this particular step represents the first clock tick at which new pixel data over the interface 26 has been refreshed from the frame memory 22 to the screen 20. The validation parameter from the previous clock tick would not be viable to compare against this validation parameter because they represent different sets of pixel data. Without this initiating step, the process would incur an additional but unnecessary refresh of pixel data on the clock tick immediately following that clock tick where the new pixel data is displayed as image data 58.

At the next n+2 clock tick, the image data 58 is refreshed to the screen 20 at block 86 and the image data 58 is read by the calculator 62 at block 88. The pixel data loop 80-82 mirrors that previously described, and it is assumed that no further pixel data interrupts the sequential clock ticks for this description. The presence of the VS pulse indicates that the frame memory 22 is fully loaded with pixel data, so the validation parameter of the n+1 clock tick is copied from the first register CCS 64 to the second register PCS 66 at block 90, and they may be momentarily equal to one another. The validation parameter from the calculator 62 for the n+2 clock tick is then copied to the first register 64 at block 92.

At the n+3 clock tick, the comparator unit 68 compares the validation parameters in the first 64 and second 66 registers at block 96. If they are identical (or below the threshold) the third register 70 is updated at block 98 with an OK entry, and if they are not identical (or exceed the threshold) the third register 70 is updated with an ERROR entry. The value in the third register is checked by the processor 40 via the interface 26 on every clock tick (or multiple thereof) to determine whether or not to reload the frame memory with new pixel data based on the contents of the third register 70.

It is noted that the art sometimes utilizes multiple frame memories for a single graphical display screen. For example, some prior art embodiments may refresh the display screen from a first frame memory on the even clock ticks $n_{even}$ and refresh the display screen from a second frame memory on the odd clock ticks $n_{odd}$. The present invention may then be embodied with each such frame memory. In other prior art embodiments, the display screen displays simultaneously a first set of pixels from a first frame memory and a second set of pixels, mutually exclusive of the first set, from a second frame memory. In such an embodiment, the present invention may be applied to each frame memory individually, or a checksum may be calculated from their combined output of first and second pixel sets (wherein the first and second frame memories are considered together as the memory of the present invention). Thus the present invention is applicable to a wide variety of frame memory arrangements.

The embodiments of this invention may be implemented by computer software executable by a data processor of the mobile station 32 or other host device, such as the processor 40, or by hardware, or by a combination of software and hardware. Further in this regard it should be noted that the various blocks of the logic flow diagram of FIG. 4 may represent program steps, or interconnected logic circuits, blocks and functions, or a combination of program steps and logic circuits, blocks and functions.

The memory or memories 22, 46, 46a may be of any type suitable to the local technical environment and may be implemented using any suitable data storage technology, such as semiconductor-based memory devices, magnetic memory devices and systems, optical memory devices and systems, fixed memory and removable memory. The data processor(s) 40 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is noted that the teachings of the present invention may be extended to checking any memory beyond only display data, whether volatile or non-volatile. It is particularly advantageous for data that is refreshed from a source to a temporary memory, as with the displayed image data detailed above, but may be used to validate data that is not routinely refreshed. For example, mobile stations store digital representations of signal constellations, which may be in volatile or non-volatile memory storage devices that are subject to corruption over time for any number of reasons. Corruption of that particular data leads to errors in encoding/decoding signal data, or complete inoperability due to excessive errors when the corruption of the signal constellation data is acute. The teachings of the present invention may be used to check such data at system start-up, where the current checksum value is calculated and compared to the checksum calculated at the previous system start-up and stored in a register analogous to the second register PCS 66. Other data that is expected to change over time but less frequently than display data, such as user-input contact lists, personal financial data, and the like may also be validated using the above teachings, at a frequency appropriate for that data. When there is an update to user-entered data, the aged value (appropriate for the unrevised data) that was previously stored in the second register PCS 66 is erased or ignored and replaced with a value appropriate for the revised data. For data such as signal constellations, a new value appropriate to the revised data may be directly loaded into the second register PCS 66 as part of the software/data update (rather than calculated from the revised data), as an additional check to ensure that the revised data has actually loaded as expected.

For either the display data or other data, the parameter stored in the first and second registers 64, 66 need not be a checksum but instead may be some other parameter quantifying or qualifying the underlying data. For example, validation data stored in the first and second registers 64, 66 may be specific to one or more rows or columns of arrayed data, may represent some computational value taken from the underlying data, may be merely a single parity bit relevant to the entire set of underlying data (e.g., XOR, OR or NOR each data point value in a particular sequence to yield a single parity bit result), or any other data validation parameter usable for validating accuracy of the underlying data.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method comprising:
   storing image data in a memory;
   determining and storing a first validation parameter of the image data stored in the memory at a first time;
   determining and storing a second validation parameter of the image data stored in the memory at a second time;
   comparing the stored first and second validation parameters; and
   updating the image data in the memory when the compared first and second validation parameters are not equal within a threshold.

2. The method of claim 1, wherein the memory comprises a frame memory that refreshes image data to a graphical display screen at a rate R Hz, and a difference between the first and second times is n/R, where n is an integer.

3. The method of claim 2, wherein the method operates continuously until a new set of image data is loaded into the frame memory.

4. The method of claim 1 wherein storing the image data in the memory comprises uploading to the memory the image data and a flag that identifies the uploaded image data over other the image data uploaded previously to the memory.

5. The method of claim 1, wherein the first and second validation parameters are calculated identically.

6. The method of claim 1, wherein the first validation parameter is initially stored at a first register, and moved to a second register when the second validation parameter is stored at the first register.

7. The method of claim 1, wherein each of the first and second validation parameters comprises a checksum.

8. The method of claim 1, wherein the first and second validation parameters are determined from different locations along a data path along which image data follows toward a display screen.

9. An apparatus comprising:
   a graphical display screen;
   a memory for storing image data having an output coupled to an input of the display screen for refreshing the image data to the display screen;
   a calculator having an input coupled to an output of the memory and configured to determine a validation parameter of the image data;
   a first register having an input coupled to an output of the calculator;
   a second register having an input coupled to a first output of the first register; and
   a comparator having parallel inputs from a second output of the first register and an output of the second register;
   wherein the memory is configured to update the stored image data when a difference indicated by the comparator exceeds a threshold.

10. The apparatus of claim 9, wherein the calculator and display screen are each coupled to the same output of the memory.

11. The apparatus of claim 9 further comprising a timing controller coupled to the memory and configured to determine a rate R Hz at which the image data is refreshed to the display screen, wherein the calculator is configured to determine a validation parameter every n/R seconds, where n is an integer.

12. The apparatus of claim 9 further comprising a third register having an output coupled to an input of the comparator and configured to store a comparison result, the third register having an output coupled to an interface that inputs image data to the memory.

13. The apparatus of claim 9 comprising a component of a mobile station.

14. An apparatus comprising:
    storage means for storing image data;
    display means, coupled to the storage means, for displaying the image data;
    timing means for controlling a rate R Hz at which the image data is refreshed to the display means;
    calculating means for determining a validation parameter of the image data at different times according to the rate R Hz;
    comparing means for comparing the validation parameters determined at the different times; and
    updating means for updating the image data in the storage means when the compared validation parameters are not equal within a threshold.

15. The apparatus of claim 14 embodied as a display unit where
    the storage means comprises a frame memory;
    the display means comprises a graphical display screen;
    the timing means comprises a local clock;
    the calculating means comprises a calculator for determining a checksum; and
    the comparing means comprises two registers for storing the checksums determined at different times and a comparator unit for comparing the checksums stored in the registers.

16. An information bearing medium storing a program of machine-readable instructions, executable by a digital data processor, to perform actions directed toward validating data stored in a memory, the actions comprising:
    determining at a first time a first validation parameter of image data stored in a memory;
    storing the first validation parameter;
    determining at a second time a second validation parameter of the image data stored in the memory;
    storing the second validation parameter;
    comparing the first and second validation parameters and storing the result; and
    updating the image data in the memory when the compared first and second validation parameters are not equal within a threshold.

17. The medium of claim 16, wherein the first and second validation parameters are identically calculated.

18. The medium of claim 16, wherein the memory comprises a frame memory and the data comprises image data, the actions further comprising:
    updating the contents of the frame memory based on the result.

19. The medium of claim 16, the actions further comprising:
    outputting the result outside a device in which the information bearing medium resides when the program is in a test mode.

* * * * *